(12) United States Patent
Mencher et al.

(10) Patent No.: US 9,175,760 B2
(45) Date of Patent: Nov. 3, 2015

(54) STARTING ELEMENT WITH HYDRODYNAMIC TORQUE CONVERTER

(71) Applicants: Georg Mencher, Grafenrheinfeld (DE); Peter Frey, Gerolzhofen (DE); Jörg Sudau, Niederwerrn (DE)

(72) Inventors: Georg Mencher, Grafenrheinfeld (DE); Peter Frey, Gerolzhofen (DE); Jörg Sudau, Niederwerrn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 17 days.

(21) Appl. No.: 13/950,374

(22) Filed: Jul. 25, 2013

(65) Prior Publication Data
US 2014/0027230 A1    Jan. 30, 2014

(30) Foreign Application Priority Data
Jul. 25, 2012    (DE) .................. 10 2012 213 012

(51) Int. Cl.
*F16H 45/02* (2006.01)
*F16H 41/24* (2006.01)

(52) U.S. Cl.
CPC .......... *F16H 45/02* (2013.01); *F16H 2041/246* (2013.01); *F16H 2045/0226* (2013.01); *F16H 2045/0263* (2013.01); *F16H 2045/0284* (2013.01)

(58) Field of Classification Search
CPC ............ F16H 45/00; F16H 2045/0226; F16H 2045/0263

USPC ............ 192/3.21; 60/338, 341, 345, 361, 362
See application file for complete search history.

(56) References Cited

U.S. PATENT DOCUMENTS

| 5,241,820 A * | 9/1993 | Fukunaga et al. ............... 60/341 |
| 2008/0236975 A1* | 10/2008 | Frey et al. ..................... 192/3.29 |
| 2010/0242466 A1* | 9/2010 | Krause et al. ................... 60/327 |
| 2011/0099992 A1* | 5/2011 | Magerkurth et al. ........... 60/435 |
| 2011/0192692 A1* | 8/2011 | Werner et al. ................. 192/3.29 |
| 2012/0080282 A1* | 4/2012 | Takikawa et al. ............ 192/3.28 |

FOREIGN PATENT DOCUMENTS

DE    10 2006 042441    3/2008

* cited by examiner

*Primary Examiner* — Richard Lorence
(74) *Attorney, Agent, or Firm* — Cozen O'Connor

(57) ABSTRACT

A starting element for transmitting torque from a drive-side rotational input (14) of the starting element to a driven hub (8) includes a hydrodynamic torque converter (4) which has a turbine coupled to the driven hub (8) so as to be fixed with respect to rotation relative to it and which comprises a turbine shell (56) with turbine blades (22) arranged therein. A maximum extension of the turbine shell (56) opposite an axial direction (12) terminates at a first axial position (53), and an impeller (20) located opposite the turbine in the axial direction (12). A stator (24) is arranged between the turbine and the impeller (22) and is coupled via a stator flange (58) to a freewheel (52) adjoining the driven hub (8) in an axial direction (12). A center of the freewheel (52) is located at a second axial position (54). A difference between the first axial position (53) and the second axial position (54) is greater than a predetermined minimum value.

7 Claims, 2 Drawing Sheets

STARTING ELEMENT WITH HYDRODYNAMIC TORQUE CONVERTER

BACKGROUND OF THE INVENTION

1. Field of the Invention

The present invention relates to starting elements or starting converters, particularly a starting element comprising a hydrodynamic torque converter.

2. Description of the Related Art

Starting elements for transmitting a torque from a drive unit to a downstream drivetrain, for example, a transmission, are known in a variety of embodiments. Hydrodynamic converters or hydrodynamic torque converters which are mechanically locked up to increase energy efficiency after starting in the so-called lockup mode of converter lockup clutches so as to prevent flow losses and to optimize consumption of fuel or driving energy are often used to enable automatic starting. Starting elements or starting converters of this kind are often combined with so-called torsional vibration dampers which can comprise one or more stages and which have a drive-side input component part that can be connected to a rotating drive unit so as to be fixed with respect to rotation relative to it. Located between this input component part and a driven-side output component part are one or more energy accumulators or damper elements, for example, in the form of coil springs, which can serve to suppress vibrations in the drivetrain in lockup mode. Accordingly, the torque is transmitted from the input component part of the torsional vibration damper, via the energy-accumulating or vibration-damping elements, to the output component part which is connected to the output of the starting element so as to be fixed with respect to rotation relative to it. In general, by drive-side component is meant hereinafter a component or assembly which, with respect to the flow of force from the driving unit to the end of the drivetrain, is located closer to the driving unit than a component designated as being on the driven side.

Further, so-called tuned mass dampers are also installed in order to further increase driving comfort and to further suppress vibrations in the drivetrain with locked up converter. Tuned mass dampers are, generally speaking, added mass linked to the drive system or torsional vibration damper by a suspension system. For example, a tuned mass damper operates on the principle that a vibratory system comprising a main mass and an auxiliary mass is so tuned with respect to its natural frequency that at a certain excitation frequency the auxiliary mass, referred to hereinafter as damper weight, carries out a forced vibration, while the main mass remains at rest so that vibration frequencies of this kind can be efficiently suppressed.

To achieve the suppression of vibrations over a larger range of rotational speeds, speed-adaptive mass dampers are used whose natural frequency or resonant frequency changes as a function of rotational speed, for example, proportional to the rotational speed. Thus by tuned mass damper is meant herein a device or mechanism or arrangement of components by which no torque is transmitted and which is capable of removing energy from the drivetrain at a determined, possibly variable, vibration frequency in order to suppress torsional vibrations occurring at this frequency.

Arranging a plurality of such components or assemblies in a starting element in an efficient and space-saving manner represents a substantial challenge.

SUMMARY OF THE INVENTION

Embodiments of the present invention make this possible in that a hydrodynamic torque converter is used in a starting element for transmitting a torque from a drive-side rotational input of the starting element to a driven hub, wherein a first axial position of an edge of a turbine shell limiting a turbine opposite to an axial direction has a predetermined position with respect to a second axial position which is defined by the center of a freewheel by which a stator of the hydrodynamic torque converter is mounted so as to be rotatable in one direction. In particular, the difference between the first axial position and the second axial position is greater than a predetermined minimum value. In some embodiments, the turbine is offset in the axial direction in such a way that its boundary oriented opposite to the axial direction is located approximately at the axial position of the center of the freewheel for the stator.

In other words, the turbine can be offset in the axial direction toward the freewheel of the stator in such a way that additional installation space for installing additional mechanical components is provided in a radial direction perpendicular to the axial direction outside of a turbine flange by which the turbine is connected to the driven hub of the starting element so as to be fixed with respect to rotation relative to it. In this way, it is possible to provide a starting element with a compact arrangement containing a plurality of assemblies.

According to some embodiments, a predetermined minimum value for the difference between the two axial positions is 0 mm so that the first axial position of the boundary of the turbine is located behind the second axial position of the center of the freewheel, i.e., the entire hydrodynamically active arrangement of the hydrodynamic torque converter comprising turbine, stator and impeller is offset in the axial direction with respect to the freewheel such that it is located completely behind the center of the freewheel in order to furnish additional axial installation space for possible further component assemblies in the starting element without impairing functionality.

According to some further embodiments, the predetermined minimum value is 5 mm, i.e., the hydrodynamically active arrangement comprising turbine, stator and impeller is located for the most part in an axially offset manner behind the freewheel.

Accordingly, embodiments of the invention render it possible, inter alia, to install additional component parts in an existing starting element or in an existing converter, for example, for a motor vehicle, without having to alter the position of already existing toothed engagements between stator and stator support shaft or between the driven hub for the transmission input shaft.

According to some embodiments, the stator is connected to the freewheel by a stator flange extending in radial direction from the freewheel to the stator in order to bring about an axial offset, and the stator flange has a conical region whose lateral surface forms an angle in the range between 28° and 63° with the radial direction perpendicular to the axial direction. In other words, the axial offset is made possible, inter alia, by a flange of a basic conical geometry, which flange is inclined with respect to the radial direction. This angle can also lie within an interval from 35° to 63° or from 45° to 63° in alternative embodiments as the case may be.

According to some embodiments, a turbine flange, by which the turbine is connected by a first mechanical connection to the driven hub so as to be fixed with respect to rotation relative to it, also extends in a conical region at least partially parallel to the conical region of the stator flange. In some embodiments, this can result in an improved flow direction of the hydraulic oil or hydraulic fluid which circulates in the hydrodynamic torque converter.

Further, according to some embodiments of the invention, the hydrodynamic torque converter is compressed in axial direction, i.e., an aspect ratio A between an axial dimension of the hydrodynamic torque converter and a radial dimension of the turbine lies in a range between 0.55 and 0.8 so that the overall structure is approximately oval. In this context, the axial dimension of the hydrodynamic torque converter refers to the dimension between the turbine shell limiting the torque converter opposite the axial direction and the impeller shell limiting the hydrodynamic torque converter in the axial direction. In other words, according to some embodiments, in addition to the axial offset, a hydrodynamically active circuit can be used which extends farther radially than axially in order to create even more installation space in the axial direction without impairing overall functionality. In alternative embodiments, the aspect ratio A can also be in a range between 0.6 and 0.8 or in a range between 0.65 and 0.8.

According to some embodiments of the invention, the additionally gained installation space is used to arrange a tuned mass damper between a torsional vibration damper, which follows the hydrodynamic torque converter opposite the axial direction, and the hydrodynamic torque converter itself so as to improve the vibration-damping characteristics of the starting element without requiring significantly more installation space in the axial direction. According to some embodiments of the invention, it is possible in particular for a plurality of damper weights of the tuned mass damper which are movable in the radial direction to be arranged completely radially outside of the turbine flange, that is, to make use of the obtained installation space in its entirety for the additional weights.

According to some embodiments, the additional axial space can be further exploited in an advantageous manner when a second mechanical connection, by which the tuned mass damper is connected to the torsional vibration damper so as to be fixed with respect to rotation relative to it, lies radially outside of a first mechanical connection by which the turbine flange is connected to the driven hub so as to be fixed with respect to rotation relative to it.

Accordingly, some embodiments of the invention render it possible to meet higher requirements on the part of the vehicle manufacturer respecting comfort and driving performance without requiring significant modifications of the entire chassis, since an embodiment of a starting element according to the invention can be produced with the same outer dimensions as before.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Presently preferred embodiments of the present invention will be described in more detail in the following with reference to the accompanying drawings in which.

DETAILED DESCRIPTION OF THE PRESENTLY PREFERRED EMBODIMENTS

Figure 1A:
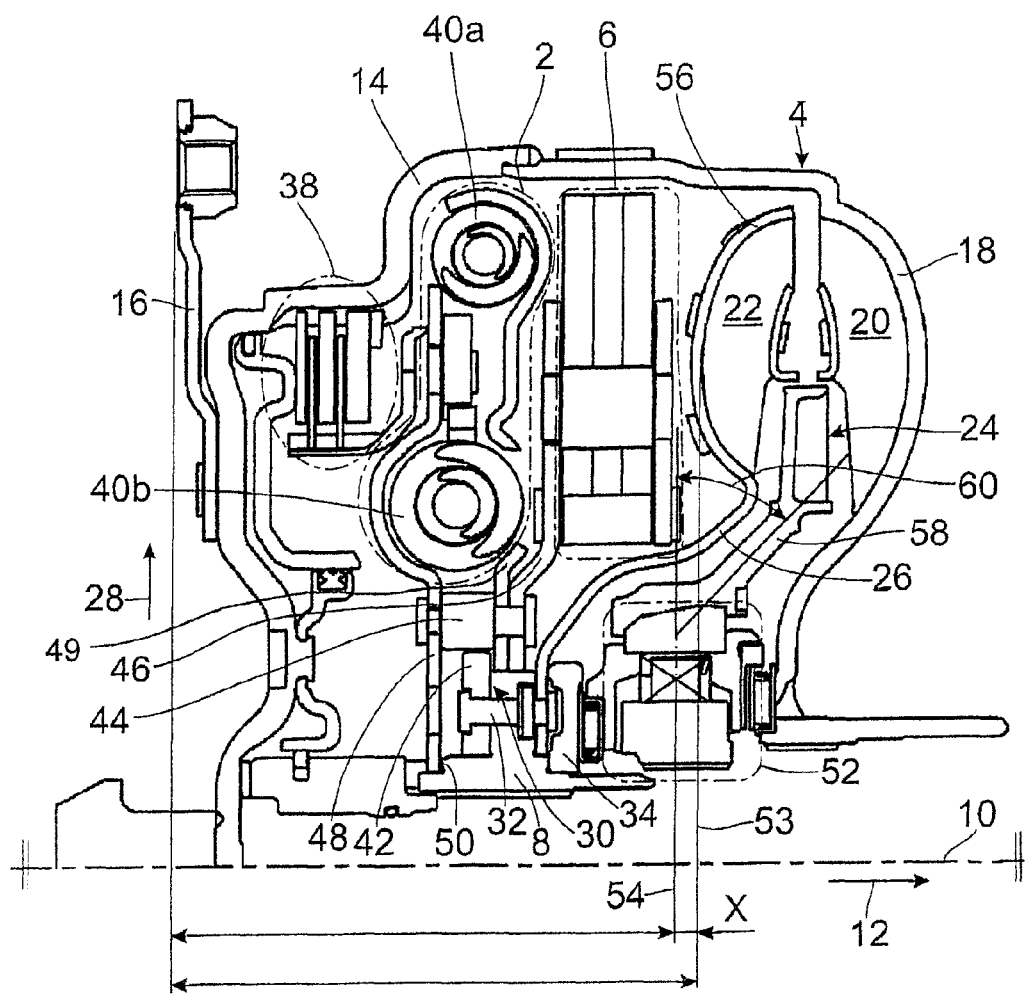
FIG. 1A is a sectional view through one half of an embodiment of a starting element.

FIG. 1A shows an embodiment of a starting element comprising a torsional vibration damper 2, a hydrodynamic torque converter 4 and a tuned mass damper 6. A driven hub 8 has an inner toothing into which, for example, an input shaft of a transmission can be fitted so that torque or rotation transmitted by the starting element can be transmitted to a driven side.

During operation, the driven hub 8 rotates around an axis of rotation 10 along which the substantially rotationally symmetric starting element extends in an axial direction 12 parallel to the axis of rotation 10. The link to a drive is carried out by a drive-side housing half, i.e., the converter cover 14, which is connected via flexible plates 16 to a drive unit, not shown for the sake of simplicity, for example, a combustion engine or electric motor. The engine-side converter cover 14 is welded to a transmission-side or driven-side housing part, i.e., the impeller shell 18, which has at its axial end, as part of the hydrodynamic torque converter 4, impeller blades 20 by which a hydraulically active liquid is conveyed in direction of turbine blades 22 of the hydrodynamic converter when the housing is set in rotation by the flexible plates 16.

The hydrodynamic torque converter further has a stator 24 which closes the hydraulic circuit between the impeller blades 20 and turbine blades 22. The stator 24 is connected to a freewheel 52 by a stator flange 58. A freewheel 52 is an arrangement of components or component parts which allows rotation in one rotating direction and prevents rotation in the opposite rotating direction.

The turbine is connected via a turbine flange 26 to the driven hub 8 so as to be fixed with respect to rotation relative to it in order to transmit the rotation of the turbine blades 22. More precisely, the driven hub 8 has a fastening flange 30 extending therefrom in a radial direction 28 perpendicular to the axial direction 12, which fastening flange 30 is connected to the turbine flange 26 of the turbine so as to be fixed with respect to rotation relative to it by a first mechanical connection 32 in the form of rivets.

To improve the stability of the connection, an annular pressure plate 34 is arranged on the side of the turbine flange 26 opposite the fastening flange 30 in axial direction 12. The pressure plate 34 exerts a force on the turbine flange 26 opposite the axial direction 12 and extends opposite the radial direction 28 to the driven hub 8 so as to be supported at the driven hub 8 and so as to increase the stability of the connection between the turbine flange 26 and the fastening flange 30 of the driven hub 8. The loading of the rivet connection can be significantly reduced by axially clamping the turbine between two component parts, i.e., between driven hub 8 and pressure plate 34, which increases the operating stability and reliability.

In the illustrated embodiment, the pressure plate 34 extends opposite the radial direction inward to the driven hub 8 which centers and fixes the pressure plate radially. The rear side, i.e., the axial end of the pressure plate 34, is formed in the embodiment shown in FIG. 1A as a race for a rolling bearing on which the hub of the stator 24 is supported opposite the axial direction 12 so that the force used for clamping the turbine flange 26 is exerted via the rolling bearing and via the pressure plate 34 opposite the axial direction. In alternative embodiments, a plain bearing can also be used instead of the thrust bearing or rolling bearing. Of course, if rolling bearings are used, any type of bearing may be considered, for example, conical roller bearings, cylindrical roller bearings, barrel roller bearings, thrust needle bearings. The individual rolling bearings may be constructed of steel or a resistant plastic. In particular, the pressure plate 34 can also be made of plastic in case of a plain bearing. To improve the oil flow or to guide oil past a plain bearing or rolling bearing, the pressure plate can also have, e.g., grooves or recesses at its axial end for guiding or channeling oil.

When starting the starting element in FIG. 1A, the power path to the driven hub 8 is produced via the impeller blades 20, the turbine blades 22 and the turbine flange 26 of the turbine. After starting, the converter lockup clutch 38 shown in FIG. 1A is hydraulically activated, which produces a flow of force between the driven converter cover 14 and an input component part of the torsional vibration damper 2 which is not shown in FIG. 1A for the sake of simplicity. Although a two-stage torsional vibration damper 2 is shown in FIG. 1A, it goes without saying that a one-stage or multi-stage torsional vibration damper can also be used in alternative embodiments.

In the case of the two-stage torsional vibration damper 2 in FIG. 1A, torque and rotation are transmitted by two spring elements 40a and 40b from the input part to an output part 42 of the torque converter which is connected to the fastening flange 30 of the driven hub 8 by the first mechanical connection 32 to produce the driven-side power path. For efficient further damping of rotational vibrations after starting, i.e., when the converter lockup clutch 38 is engaged, the tuned mass damper 6 is coupled by a second mechanical connection 44 to the cover plate 49 of the torsional vibration damper 2 so as to be fixed with respect to rotation relative to it. The second mechanical connection 44 is located farther radially outside than the first mechanical connection 32, which makes possible the extremely compact arrangement, shown in FIG. 1A, of the tuned mass damper 6 between the torsional vibration damper 2 and the turbine.

In the embodiment shown in FIG. 1A, the tuned mass damper 6 is riveted to the torsional vibration damper 2 via a damper support member 46 extending from the radially outer side to the radially inner side to the driven hub 8. In other words, the first mechanical connection 32 and the second mechanical connection 44 are each formed as rivet connections in the embodiment illustrated in FIG. 1A. Of course, in alternative embodiments each connection can be carried out by any type of mechanical fastening. One or more damper weights enabling the functionality of the tuned mass damper 6 are fastened to the damper support member 46.

Figure 1B:
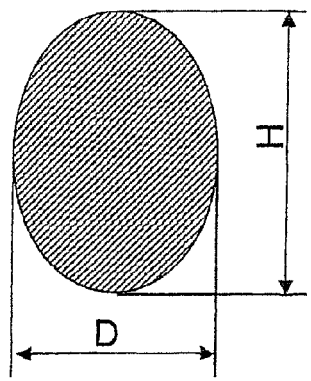
FIG. 1B is a schematic view of the relationship of the width and height of the hydrodynamic torque converter.
Figure 2:
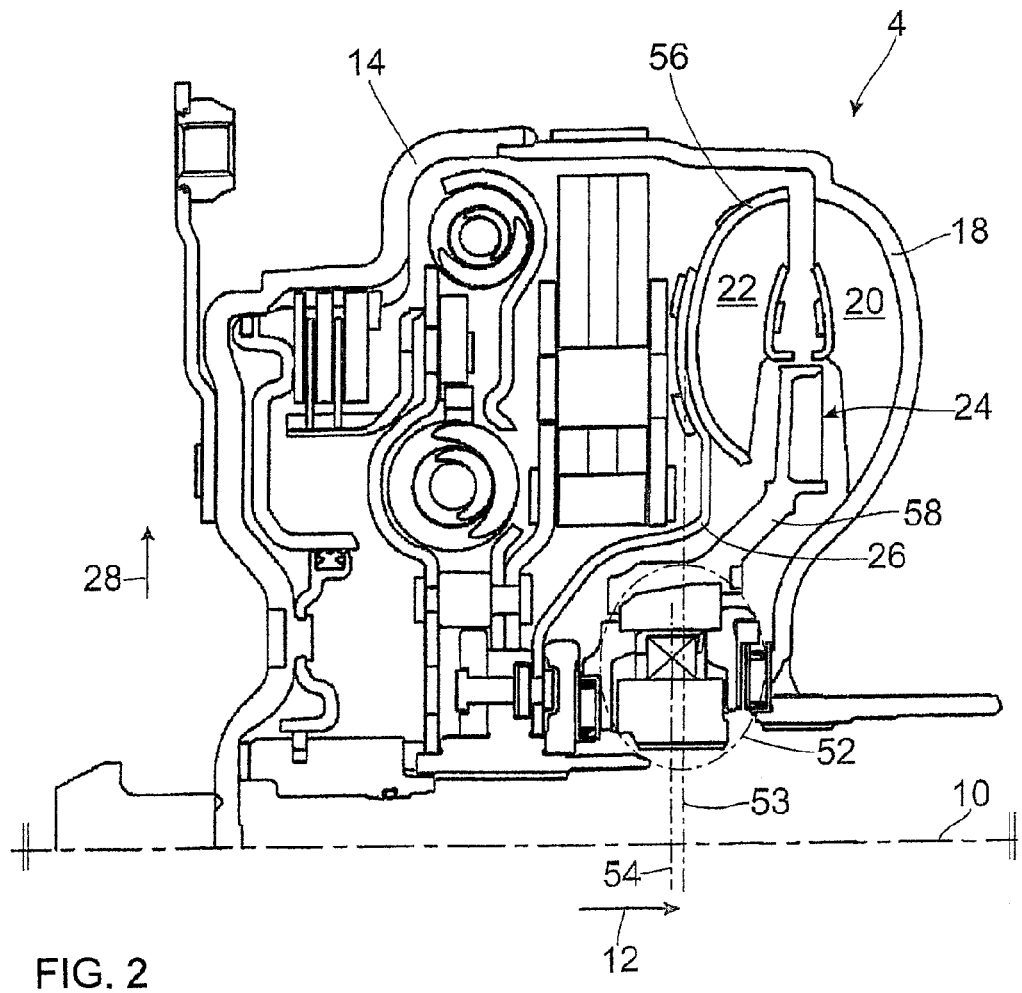
FIG. 2 is a sectional view through one half of a further embodiment of a starting element.

Further, in the embodiments shown in FIGS. 1A and 1B and 2, the damper support member 46 is supported by its center bores on the outer diameter of the driven hub 8, which can prevent imbalances even when using large damper weights in case of an unfavorable arrangement of additional bearing points or in case of play in the bearings employed.

In the embodiment shown in FIGS. 1A and 1B and 2, the torsional vibration damper 2 which is coupled to the damper support member 46 via the second mechanical connection 44 is also supported inwardly in the radial direction 28 on the driven hub 8 by the damper support member 46 resulting in a large supporting distance. This can effectively prevent possible tilting of the mass damper 6 and torsional vibration damper 2 relative to the driven hub 8.

In alternative embodiments, it is also possible, of course, that the torsional vibration damper 2 is also radially supported directly on the driven hub 8. In other words, in an embodiment of this kind one of the rotating component parts, i.e., the output component part 42, the input part or an intermediate plate between the flexible elements 40a and 40b would extend inwardly in the radial direction to the surface of the driven hub 8 to achieve support.

In order to achieve a support of the torsional vibration damper 2 in the axial direction 12 in addition, a cover plate 48 of the torsional vibration damper 2 extends inward opposite the radial direction to the extent that the cover plate 48 overlaps in the radial direction 28 with an end face surface 50 at the driven hub 8 which partially extends parallel to the cover plate 48, so that the end face surface 50 inhibits or prevents a movement of the torsional vibration damper 2 in the axial direction or opposite thereto. This can serve to prevent the efforts of the torsional vibration damper 2 to move in axial direction 12 which are brought about by reason of the axial forces exerted on the cover plate of the torsional vibration damper 2. As a result of this, the torsional vibration damper 2 can in turn withstand higher loads in the form of friction, deformations, etc., and a limiting of functionality due to axial displacements on adjoining component parts, e.g., the converter lockup clutch 38, can be prevented so that the overall operability can be maintained without malfunction for a longer period of time.

In the embodiment shown in FIG. 1A, the movement of the torsional vibration damper 2 in axial direction 12 is impeded by the end face surface 50 at the driven hub 8, whereas the movement opposite the axial direction 12 is limited or inhibited by a bushing which is connected to the driven hub 8 so as to be fixed with respect to rotation relative to it or by the cover hub. In some embodiments, the bearing support between the end face surface 50 and the cover plate 48 is subject to play so that no increase in friction can come about.

In alternative embodiments, an axial support can also be carried out by the intermediate plate of the torsional vibration damper 2 whose relative movements with respect to the driven hub 8 are smaller, so that possible wear can be further prevented. The bushing which acts opposite the axial direction 12 so as to inhibit movement can be connected to the driven hub 8 or to the converter cover 14 so as to be fixed with respect to rotation relative to it. Further, axial forces are conducted directly through the axial contact between the bushing and the driven hub 8 without negatively influencing the torsional vibration damper 2.

Although this is not shown in the embodiments in FIGS. 1A and 1B and 2, additional elements can also be installed in a starting element according to the invention. For example, friction devices for damping vibrations can be incorporated and can be arranged, inter alia, between the left-hand cover plate 48 and the driven hub 8. Alternative arrangements of friction devices of this kind can be arranged, for example, between the left-hand cover plate 48 and the output component part 42 of the torsional vibration damper 2 or between the head piece and the left-hand cover plate 48.

According to an embodiment of the invention, the hydrodynamic torque converter 4 is offset in the axial direction 12 with respect to the center of the freewheel 52. The center of the freewheel is understood herein to refer to that second axial position 54 in the axial direction 12 which determines the center point in the axial direction 12 with respect to the components forming the freewheel 52, i.e., for example, the axis of symmetry of a freewheel or the like. A difference X with respect to a first axial position 53 (X1), which is determined by the end of the turbine shell 56 limiting the turbine opposite the axial direction 12, and the second axial position 54 (X2) is greater than 0 in the embodiments shown in FIGS. 1 and 2. In other words, the hydrodynamically active circuit of the hydrodynamic torque converter 4 is located completely behind the center of the freewheel 52 in the axial direction 12.

To determine the difference between the first axial position 53 and second axial position 54, the coordinate values of the axial positions are determined in such a way that the coordinate values increase in the axial direction. Without limiting generality, it is assumed in FIG. 1A that the axial positions refer to a reference point given by the position of the flexible plates 16 for introducing torque into the starting element. Of course, in alternative embodiments the axial position can also be determined with reference to a different origin.

The stator 24 is connected to the freewheel 52 via a stator flange 58. The stator flange 58 has a conical region to bring about the offset of the stator 24 relative to the freewheel 52. The conical region, or more precisely a lateral surface of the cone forming the conical region, forms an angle 60 with the radial direction 28, which angle 60 is selected depending on the desired axial offset and is preferably between 28° and 63°.

In the embodiment shown in FIG. 1B, the turbine comprising the annular turbine shell 56 and the turbine blades 22 arranged therein is connected to the driven hub 8 so as to be fixed with respect to rotation relative to it by a turbine flange 26 which is formed integral with the turbine shell 56. In alternative embodiments, the turbine flange 26 and the turbine shell 56 can also be formed by two separate component parts as is illustrated by way of example in FIG. 2. A two-part construction of this kind can allow the—in this case—separate component parts to be produced more simply and with high accuracy. Further, in some embodiments, the different component parts, i.e., the turbine shell 56 and the turbine flange 26, can be produced from different materials so that the various requirements for the individual component parts can be met in an optimal manner so as to save on total weight, for example. In particular, both component parts can be dimensioned independently from one another, for example, with respect to their material thickness, so as to be suited to the load.

The connection between the turbine flange 26 and turbine shell 56 can be produced in any way by frictional engagement, positive engagement, or bonding engagement. For example, the connection can also be produced in that the turbine blades 22 project through the turbine shell 56, wherein the projecting portions of the turbine blades 22 are tucked or rolled in order to produce a connection fixed against rotation between the turbine shell 56 and the turbine flange 26. In general, a first mechanical connection or second mechanical connection in the sense described above can be any type of frictional engagement, positive engagement or bonding engagement. In this context, a positive engagement means that a connection preventing the components connected to one another from moving relative to one another in at least one connection direction is brought about in that the geometry of the components used for the connection is so selected that these components intersect in a direction perpendicular to the connection direction so as to prevent movement in the connection direction in this way. Frictional engagement in this context means that a connection preventing the components connected to one another from moving relative to one another in at least one connection direction is brought about by a force acting between the components perpendicularly to the connection direction, which force leads, for example, to increased cohesive forces or adhesive forces. Accordingly, a frictional engagement persists as long as a force brought about between the components by static friction is not exceeded. Bonding engagement in this context means that a connection preventing the components connected to one another from moving relative to one another in at least one connection direction is brought about by atomic or molecular forces. In so doing, the materials of the connected components can blend at least partially at an interface. This need not take place exclusively between the materials of the connected components. Rather, a material component which brings about or assists in the blending, for example, an adhesive or a material of a welding wire, can be provided additionally so that a plurality of materials are blended together at the interface on a microscopic scale.

Further, in the embodiment shown in FIG. 1A, the hydrodynamic torque converter 4 has an aspect ratio A=D/H of less than 1. In other words, a width D is smaller than a height H of the hydrodynamic torque converter, which additionally contributes to the saving of installation space in the axial direction 12 without altering the performance of the hydrodynamic torque converter 4.

Thus the aspect ratio A describes the ratio between the axial dimension of the hydrodynamic torque converter 4 and the radial dimension thereof. The radial dimension is determined, for example, by the radial dimension of the turbine shell 56, whereas the axial dimension corresponds to the maximum axial dimension of the hydrodynamic torque converter 4 between the turbine shell 56 and the impeller shell 18 limiting the impeller in axial direction.

Accordingly, in the case of the converter shown in FIG. 1A for installation in a motor vehicle, additional space is gained in the starting element through an axial displacement of the torus or hydrodynamic torque converter 4 in direction of the transmission. The extent of the displacement can be such that the axial boundary of the flow space through the turbine shell 56 is located behind the center of the freewheel 52 of the stator 24.

As is shown in FIGS. 1A and 1B and 2, the embodiments shown therein have a large axial offset between freewheel 52 and stator blades of the stator 24. The stator flange 58 connecting the freewheel 52 and stator blades has a conical shape which extends at least partially parallel to the flange regions of the impeller shell 18 and to the turbine flange 26, which can lead to an improvement in the directing of oil in the oil circuit in some embodiments. Further, this can result in an improved clearance between the component parts, an improved stiffness of the component parts and reduction in materials used.

Although the embodiments illustrated in FIGS. 1A and 1B and 2 show a configuration comprising a two-stage torsional vibration damper 2 and a speed-adaptive tuned mass damper, any other combinations for ensuring an efficient damping of vibrations in the drivetrain by making use of the additionally available axial installation space are, of course, also conceivable. For example, a combination of a two-stage torsional vibration damper with a fixed frequency mass damper (DFT) or an expanded two-stage torsional vibration damper with additional spring sets (DLT) can also be used. Of course, any other mechanisms can be arranged in the axial space made available in order to improve the characteristics of the starting element.

Due to the radial staggering of the first mechanical connection 32 and second mechanical connection 44, the turbine flange 26 can be shaped in such a way that it extends in the axial direction 12 entirely inside the tuned mass damper 6 until terminating at the turbine blades 22.

Of course, embodiments of the present invention can be used not only in passenger cars but also in trucks or stationary machinery in which the use of a starting element is necessary or useful and which, beyond this, benefit from the damping of torsional vibrations during operation.

The features disclosed in the preceding description, appended claims and drawings can be significant individually as well as in any combination for implementing the invention in its various embodiments.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A starting element for transmitting torque comprising:
   a driven hub (8);
   a drive-side rotational input (14) for transmitting torque to said driven hub;
   a hydrodynamic torque converter (4) comprising a turbine coupled to said driven hub (8) so as to be fixed with respect to rotation relative thereto, a turbine shell (56) having turbine blades (22) arranged therein, wherein a maximum extension of said turbine shell (56) opposite an axial direction (12) terminates at a first axial position (53); an impeller (20) located opposite said turbine in the axial direction (12); a freewheel (52) having a center and adjoining said driven hub in said axial direction; and a stator (24) arranged between said turbine and said impeller (20) and including a stator flange (58) for coupling said stator (24) to said freewheel (52); wherein said center of said freewheel (52) is located at a second axial position (54); and wherein a difference between the first axial position (53) and the second axial position (54) is greater than a predetermined minimum value;
   wherein said turbine comprises a turbine flange (26) connected to said driven hub (8) so as to be fixed with respect to rotation relative thereto, said turbine flange (26) extending from said driven hub (8) to said turbine in a radial direction (28) perpendicular to the axial direction (12); and wherein said turbine flange (26) is connected to the driven hub (8) by a first mechanical connection (32);
   wherein said stator flange (58) comprises a conical region having a lateral surface and extending between said freewheel (52) and said stator (24);
   wherein said turbine flange (26) comprises a conical region which extends at least partially parallel to said conical region of said stator flange (58);
   said starting element further comprising a tuned mass damper (6) arranged between a torsional vibration damper and said turbine;
   wherein said tuned mass damper (6) comprises a plurality of damper weights movable in the radial direction (28) and arranged in the radial direction outside of said turbine flange (26);
   wherein said tuned mass damper (6) is connected to a cover plate of said torsional vibration damper (2) so as to be fixed with respect to rotation relative thereto by a second mechanical connection (44); and wherein said first mechanical connection (32) is located farther inward in the radial direction (28) than said second mechanical connection (44).

2. The starting element according to claim 1, wherein said predetermined minimum value is 5 mm.

3. The starting element according to claim 1, wherein an angle (60) between said lateral surface of said conical region and the radial direction lies within a range between 28° and 63°.

4. The starting element according to claim 1, wherein the hydrodynamic torque converter (4) has an axial dimension D between said turbine shell (56) and said impeller shell (18) limiting said impeller in the axial direction (12); and said turbine shell (56) has a radial dimension H; and wherein the ratio D/H lies within a range between 0.55 and 0.8.

5. The starting element according to claim 1, further comprising:
   said torsional vibration damper (2) having an input component part adjoining said hydrodynamic torque converter (4) opposite the axial direction (12); said torsional vibration damper (2) coupleable to said rotational input so as to be fixed with respect to rotation relative thereto by said input component part of said torsional vibration damper (2) and comprising an output component part (42) coupled to said driven hub (8) so as to be fixed with respect to rotation relative thereto by said first mechanical connection (32).

6. The starting element according to claim 1, wherein an angle (60) between said lateral surface of said conical region and the radial direction lies within a range between 35° and 63°.

7. The starting element according to claim 1, wherein an angle (60) between said lateral surface of said conical region and the radial direction lies within a range between 45° and 63°.

* * * * *